Dec. 13, 1960 H. C. WATERMAN 2,963,861
ELECTRONIC FUEL CONTROL APPARATUS FOR AN ENGINE
Filed Dec. 18, 1947 2 Sheets-Sheet 1
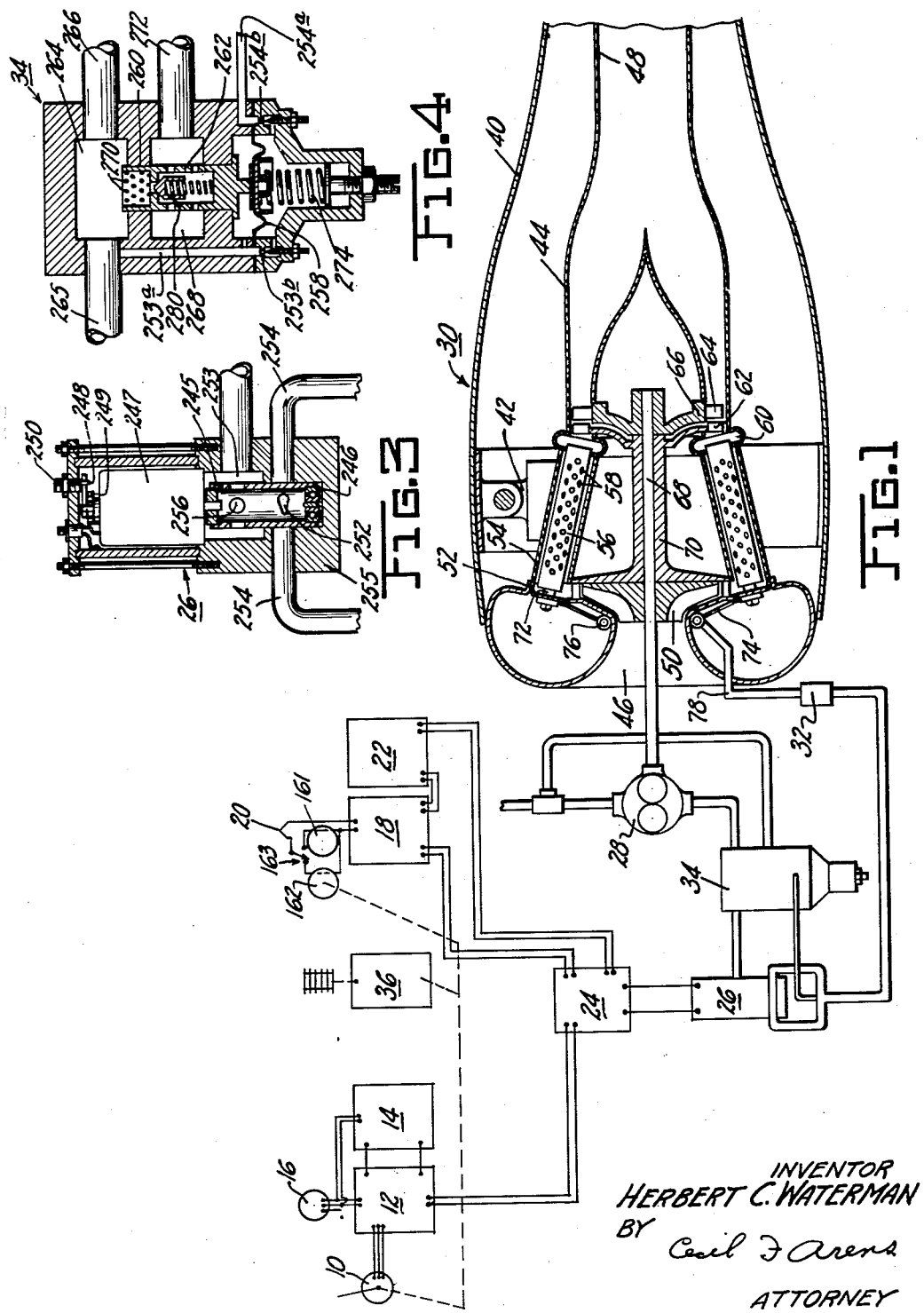
INVENTOR
HERBERT C. WATERMAN
BY Cecil F Arens
ATTORNEY

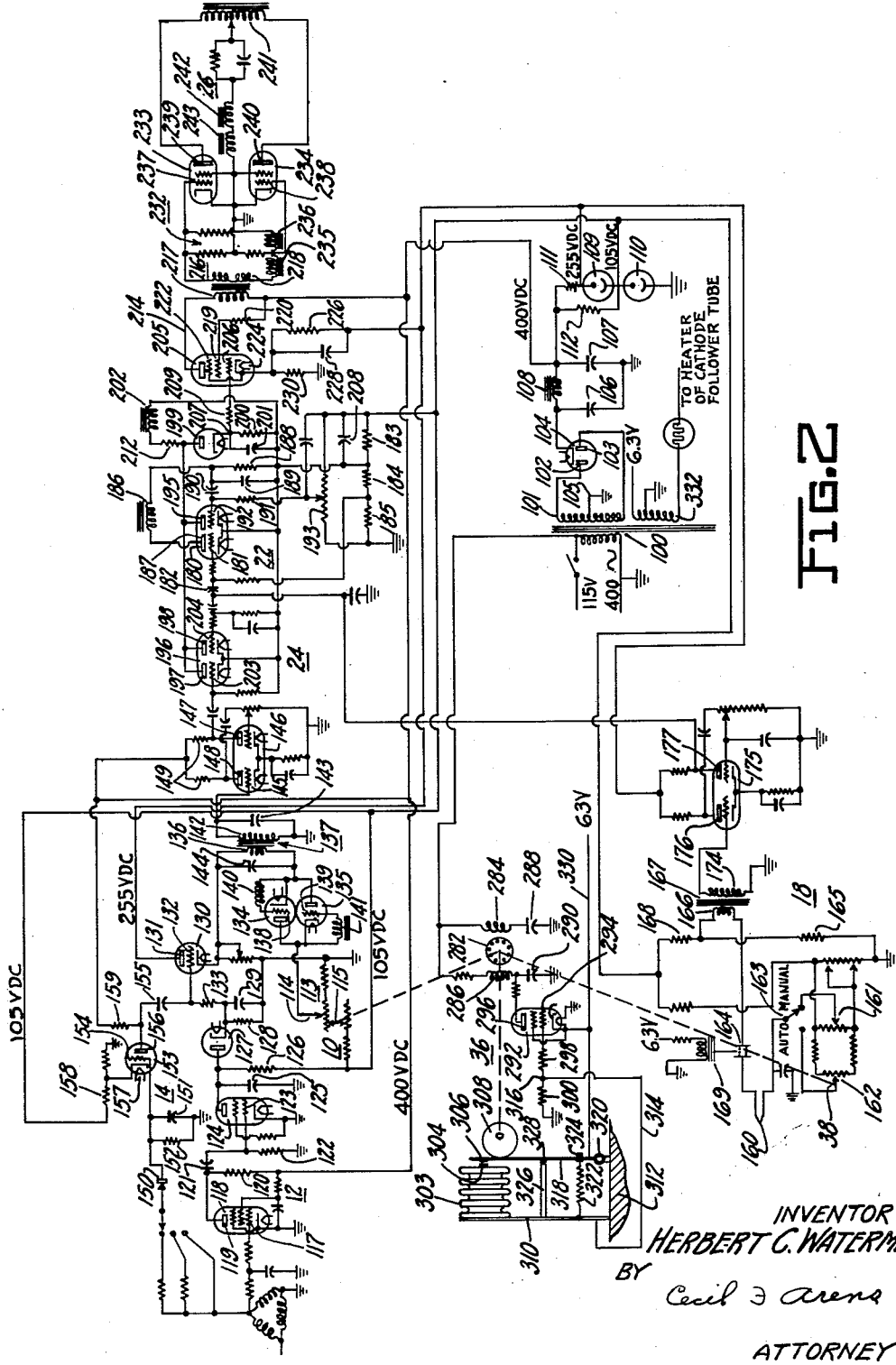

United States Patent Office 2,963,861
Patented Dec. 13, 1960

2,963,861

ELECTRONIC FUEL CONTROL APPARATUS FOR AN ENGINE

Herbert C. Waterman, Chicago, Ill., assignor to The Bendix Corporation, a corporation of Delaware Filed Dec. 18, 1947, Ser. No. 792,409

18 Claims. (Cl. 60—39.28)

This invention relates to a mechanism for controlling flow of fuel to an engine, and more particularly to an electronically operated control which regulates fuel supply to an engine.

It is a purpose of this invention to operate a turbine by controlling its r.p.m. and temperature; the primary control of the turbine is the r.p.m. selected by the pilot; the secondary control is tailpipe temperature, which functions during accelerations at any r.p.m. once flame in the turbine has been established.

An object of the invention is to provide a control for an engine wherein the fuel supplied thereto is dependent upon the difference between actual and selected r.p.m. of the engine.

Another object of the invention is to provide a control for an engine wherein the fuel supplied thereto is dependent upon the difference between actual and selected temperatures of the engine.

A further object of the invention is to provide a control for an engine wherein the fuel supplied thereto is dependent upon the difference in actual and selected r.p.m. and actual and selected temperatures of the engine.

A still more important object of the invention resides in the provision of electronic control of r.p.m. and acceleration temperature of a jet engine.

An important object of the invention resides in the provision of apparatus for electronically controlling fuel to an engine.

A yet further important object of the invention resides in the provision of an electronic control for a jet engine wherein the fuel supplied thereto is controlled by a valve operable in accordance with the difference in actual and selected speed of the engine, and in which the difference in speed is reflected as a voltage signal impressed on the grid of vacuum tube for controlling valve opening.

Another important object of the invention resides in the provision of an electronic control for a jet engine wherein the fuel supplied thereto is dependent upon the difference between the actual and selected speeds of the engine, and in which the selected speed may be automatically reselected.

The above and other objects and features of the invention will be apparent from the following description of the control device taken in connection with the accompanying drawings which form a part of this specification and in which:

Figure 1 is a block diagram of the device of the invention illustrated in connection with a jet engine with some parts of the system in diagrammatic section;

Figure 2 is a circuit diagram;

Figure 3 is a view in section of the magnetically controlled valve used in the fuel system; and Figure 4 is a view in section of the combined regulator and relief valve used in the fuel system.

Referring now to the block diagram of Figure 1, the reference numeral 10 designates the pilot's r.p.m. control which is electrically connected to a frequency sensitive amplifier 12, interconnected with a rate of change of frequency amplifier 14. Amplifiers 12 and 14 are connected in parallel with a tachometer alternator 16, which is engine driven. The alternator which is standard equipment for aircraft, is of the three phase type used to actuate the aircraft instrument panel tachometer. The frequency of the alternator output is an indication of the r.p.m. or speed of the engine. A temperature sensing amplifier 18 receives a millivoltage signal from the chromel-alumel thermocouple 20. This signal is an indication of the temperature of the engine. A rate of change of temperature amplifier 22 is interconnected with the temperature sensing amplifier 18 to anticipate any change in temperature conditions of the engine to thereby prevent engine temperature hunting. A combining amplifier 24 receives signals from the temperature, r.p.m., and rate of change amplifiers and reflects these signals as a voltage which is impressed on the control grid of an output tube to thereby control a thyratron circuit, which regulates the current through a magnetically operated valve 26 located in the fuel system of the aircraft. A pump 28 in the fuel line has an inlet port in communication with a reservoir, not shown, and an outlet port in communication with a jet engine 30 through valve 26 and cutoff valve 32. A combined regulator and relief valve 34 is interconnected in the fuel system to return fuel to the inlet side of the pump 28 to maintain a fairly constant pressure drop across valve 26.

An altitude correction device or servo mechanism 36 continuously resets the minimum r.p.m. and maximum temperatures above a predetermined altitude, in the present example 20,000 feet. This device is mechanically linked to the pilot's r.p.m. control 10 and to a potentiometer wiper arm 38.

The engine is supported in a nacelle 40 by a bracket 42. The engine comprises a casing 44 rolled or turned inwardly at its front end to thereby define an air inlet 46 and contoured at its rear end to define a reaction tube 48. A rotary air compressor 50 is located in the casing so as to force air into an annular header 52 in communication with a plurality of circumferentially spaced cylinder-like generator or burner chambers 54, which house burners 56, having air inlet passages 58 in the walls thereof. The burners are arranged to discharge into a collector ring 60 where the hot air and products of combustion are forced past a set of stationary blades 62 and against rotatable blades 64, integral with a rotor 66. The rotor 66 and air compressor 50 are mounted on a common shaft 68 rotatably supported in a bearing 70. Air entering the inlet 46 is picked up by the compressor which directs the air into the annular header 52, burner chamber 54, and thence through the air inlet passage 58 into burners 56 where combustion takes place. The expanded air and products of combustion are first directed against the blades 64 of the turbine rotor 66 to drive the compressor, and thence discharged to atmosphere through the reaction tube 48 to effect propulsion of the aircraft. Fuel is supplied to nozzles 72 through branch conduits 74 which connect the nozzles to a manifold 76 in communication with the fuel system through conduit 78.

Referring to the circuit diagram of Figure 2 the rectified direct current supply for the system comes from a 115 volt, 400 cycle supply, connected to the primary of a multi-winding power transformer 100, having a secondary 101 connected to the anodes 102 and 103 of a full wave rectifier tube 104. The midpoint of the secondary side of the transformer is grounded at 105. The pulsating direct current from the rectifier tube 104 is fed through a network consisting of two condensers 106 and 107 and an iron-core inductor 108. The action of this network is to filter the pulsating direct current to provide a steady direct current of 400 volts unregulated. In order to obtain a regulated voltage source having a voltage lower than the unregulated source a pair of voltage regulator tubes 109 and 110 are connected to the steady current source through resistors 111 and 112. The regulated voltages of 105 and 255 volts, used for r.p.m. and temperature reference voltages are held fairly constant by the voltage regulator tubes 109 and 110. A 6.3 volt secondary tap of transformer 100 connects the cathode heaters of the various tubes as well as other equipment designed for this voltage. A 12 volt tap of the secondary winding likewise connects a cathode heater of one of the tubes to be hereafter described in more detail.

For the purpose of establishing a D.C. reference voltage inversely proportional to the R.P.M. setting, the pilot's R.P.M. control 10 is provided. This control consists of a small wire wound potentiometer 113 having a contact arm 114 suitably linked to a throttle lever, not shown, which moves over a scale calibrated in R.P.M. The potentiometer is provided with a second contact arm 115 movable to vary the minimum R.P.M. setting above 20,000 feet altitude. The potentiometer is connected to the 105 volt source of regulated direct voltage. Movement of contact arm 114 to the left of its present position selects a lower engine speed but increases the reference voltage and vice versa for movement to the right of this position. The R.P.M. chosen by the pilot's control will be known as the selected R.P.M. of the engine and reflects a voltage signal inversely proportional to the selected engine speed.

For producing a signal which reflects the difference between the actual and selected engine R.P.M. the frequency (R.P.M.) sensitive amplifier system 12 is provided. The input to this amplifier is one phase of the three phase tachometer alternator 16 which establishes a signal corresponding to actual engine speed or R.P.M. The signal reflected or established by the pilot's R.P.M. control setting is also fed into the amplifier in series with the signal which reflects actual engine speed. The output signal of the amplifier is 400 cycles A.C., the amplitude of which is proportional to the error between the actual and set turbine R.P.M., and the phase of which shifts 180°, depending on whether the turbine is above or below the selected R.P.M.

The alternating voltage from the alternator is impressed on grid 117 of a heater-cathode type pentode tube 118 to drive the tube alternately to cutoff and saturation, to thereby provide a square wave output. Plate 119 of the tube 118 receives its potential from the 400 volt source of unregulated direct voltage, through a resistor 120. A differentiating circuit, including a capacitor 121 and resistor 122, extracts alternate positive and negative pulses from the square wave and impresses them on grid 123 of a thyratron tube 124, each positive pulse firing same. A capacitor 125 is connected across the thyratron tube and charged through a resistor 126. The capacitor 125 and resistor 126, which are constructed to be insensitive to ambient temperature changes, are connected to the regulated voltage supply of 105 volts. The arrangement of the capacitor 125 and resistor 126 is such that together they form a timing circuit in which the voltage across the capacitor builds up as a function of time but is reduced to a fixed value each time the thyratron is fired. A diode peak rectifier tube 127 is interconected with the timing circuit to provide a D.C. voltage across a load resistor 128 and capacitor 129 equal to the peak voltage to which the timing capacitor is charged. Attention is called to the fact that the voltage across the peak rectifiers RC filter, by proper selection of resistor and capacitor in the timing circuit, varies exactly in inverse relation with the frequency (R.P.M.) of the input.

In order that the reference voltage signal reflected by the R.P.M. setting of the pilot's R.P.M. control may be compared to the voltage signal reflected by the actual engine R.P.M., a cathode follower tube 130 is provided to match the impedance of the peak rectifiers RC filter with the lower impedance of the pilot's R.P.M. control potentiometer. The 255 volt regulated D.C. supply is connected to plate 131 of the cathode follower. Grid 132 of the tube 130 is electrically connected to the peak rectifiers RC filter through an anti-hunt voltage resistor 133 to be hereinafter described in more detail. The two voltage signals are connected in series with each other and with two triode modulator tubes 134 and 135 and with primary winding 136 of transformer 137. The tubes 134 and 135 have their grids 138 and 139 respectively connected to secondary windings 140 and 141 of the supply transformer 100. With this arrangement the two tubes are made alternately conducting so that whenever there is a difference between the signal voltages of the pilot's control 113 and the cathode follower output, current will flow through one of triodes 134 or 135, depending on the polarity resulting from the addition. The resultant current is pulsating direct and flows through the primary 136. Since the frequency of the current is controlled by the supply transformer frequency an alternating voltage of the same frequency will be produced across secondary winding 142 of the transformer 137. This alternating voltage of the secondary winding 142 varies in amplitude in proportion to the R.P.M. error and its phase depends on whether the turbine R.P.M. is faster or slower than the selected R.P.M. A pair of phase correcting capacitors 143 and 144 are connected across transformer windings 136 and 142 respectively to thereby obtain the proper phase relationship between primary current and secondary voltage. This secondary voltage, which is a resultant of the actual R.P.M. input from the tachometer alternator and the selected R.P.M. input, is impressed on grid 145 of a conventional two stage amplifier 146, having plates 147 and 148 connected to the unregulated 400 volt source, through resistors 149.

To prevent engine R.P.M. hunting, means is provided which will produce a signal proportional to the rate of change of turbine R.P.M. and which may be added (in opposition) with the turbine R.P.M. indication to provide error-rate damping. The means for producing this signal comprises a midget half wave selenium rectifier 150 the output of which is proportional to the voltage output of the tachometer alternator, a filter circuit, embracing a capacitor 151 and a resistor 152, an amplifier tube 153, having a grid 154 connected to the selenium rectifier output, and a differentiating capacitor 155 interposed between anode 156 of the amplifier tube and the anti-hunt voltage resistor 133 which forms a part of the differentiating circuit. The anode potential of tube 153 is obtained from the unregulated 400 volt source through a resistor 159. Cathode 157 of tube 153 is connected to the 105 volt regulated source through D.C. resistor 158. With this arrangement the anode current is made substantially proportional to turbine R.P.M., thereby controlling the voltage drop across the anode resistor 159 and causing the anode voltage to be inversely proportional to turbine R.P.M. With a change in anode voltage, the differentiating capacitor 155 either charges or discharges, and effects a voltage drop through the R.P.M. anti-hunt voltage resistor 133 that is proportional to the rate of change of turbine R.P.M. As previously pointed out, resistor 133 is also in the grid circuit of the R.P.M. cathode follower tube 130. The polarities across the resistor are such that when the turbine R.P.M. is changing and producing a voltage change in the peak rectifier output, the voltage change in the differentiating circuit is producing an opposing or damping voltage across the R.P.M. anti-hunt voltage resistor, preventing hunting.

As aforementioned the basic control is the turbine r.p.m. selected by the pilot. The secondary control 18 is responsive to tailpipe temperature and comes into operation at any r.p.m. after flame has been established.

This temperature is sensed by a plurality of paralleled Chromel-Alumel thermocouples, only one of which is shown at 160, which are connected to an amplifier designed so that it provides an output (temperature signal) of 400 cycle A.C., the amplitude of which is proportional to the error between the desired and actual temperatures, and the phase of which shifts 180° depending on whether the actual temperature is above or below that desired. The actual engine temperature provides one source of input to the amplifier and is sensed by the thermocouples and reflected as a millivoltage signal. The selected or desired temperature provides another source of input to the amplifier and is selected manually by the pilot or automatically by a temperature resetting device to be hereinafter described. The thermocouple millivoltage is connected in series with the selected or reference millivoltages of either the manually or automatically adjustable potentiometers 161 and 162 respectively which are connected in parallel with respect to each other and to the 105 volt regulated D.C. source. A double throw switch 163 connects the potentiometers for either manual or automatic control of the temperature reference signal. The switch is shown in a position for manual control, at which time the arm of the automatically operated potentiometer 162 is disconnected from the circuit. The millivoltages are in turn connected in series with a carbon granule cell 164, a cold junction compensation resistor 165, and a primary winding 166 of a temperature input transformer 167. The resistor 165 is supplied from the regulated D.C. source in series with a resistor 168, of high resistance, thereby producing a small but substantially constant current through the resistor. The resistance of the resistor 165 varies linearly with its temperature and the resulting change in IR drop across the resistor just compensates for the change in thermocouple output voltage due to changes in cold junction temperature. The resultant of the three millivoltages, namely, the thermocouple, reference, and IR drop millivoltages, should add up to zero, if not, current is sent through the primary 166 which is in series with the carbon granule cell modulator 164, the granule chamber of which is alternately compressed and decompressed, to thereby alternately decrease and increase its resistance, by the acoustic output of magnetically polarized diaphragm 169, which is caused to vibrate in synchronism with the 400 cycle A.C. source by supplying its exciting coil from the 6.3 volt secondary winding of transformer 100. With this arrangement, the resultant direct current from the thermocouple 160, and regulated D.C. source, is made pulsating, thereby inducing a voltage in secondary 174 of transformer 167. The amplitude of this induced voltage is proportional to the amount of current unbalance and the phase depends upon whether the temperature is actually above or below that desired. The secondary voltage of transformer 167 is fed into a conventional two stage triode resistance-capacitance coupled amplifier 175 from which the amplified voltage emanates as a temperature signal. The anodes 176 and 177 of the amplifier are connected to the 255 volt regulated D.C. source.

When automatic control is wanted the D.C. regulated millivoltage signal is selected so that below altitudes of 20,000 feet a maximum engine temperature of 800° C. plus or minus 15° C. is not exceeded regardless of how rapidly the engine r.p.m. setting is increased. However, above altitudes of 20,000 feet, the altitude servo mechanism 36 comes into operation to change the original setting of potentiometer 162 by resetting wiper arm 38, thereby establishing another millivoltage signal which combines with the signal sent out by the thermocouple to bring about a decrease in engine temperature with increase in altitude. For manual control the pilot moves the wiper arm of the potentiometer 161 over a scale, not shown, graduated in degrees centigrade to select any engine temperature desired, between 600 and 1000 degrees centigrade, at which the pilot desired to accelerate the aircraft.

To prevent engine temperature hunting the rate of change of temperature amplifier 22 is provided, which emits a signal proportional to the rate of change of engine temperature. This signal is added, in opposition, to the temperature indication signal voltage, that is, the currents flowing as a result of the two signals are added algebraically. It will be noted that the input to the amplifier 22 is the temperature indication signal voltage emanating from amplifier 175. The rate of change of temperature amplifier 22 includes a twin triode tube 180 provided with a grid 181 into which the temperature signal voltage from amplifier 175 is fed through a condenser 182. The grid is biased from the 105 volt regulated D.C. source through the network including resistors 183, 184, and 185. The anode circuit of tube 180 is supplied with alternating current from secondary winding 186 of transformer 100. The alternating voltage impressed on anode 187 of this anti-hunt tube 180 is high enough so that with grid 181 biased the proper amount, nearly one half maximum current flows on each positive half cycle when the signal voltage from amplifier 175 is zero. Now if this signal voltage from amplifier 175 increases in phase with the voltage across anode 187 it will cause an increase in anode current, on the other hand, if this signal voltage increases out of phase with the anode voltage, current through the anode circuit is decreased. A filter comprising a load resistor 188 and capacitor 189 are connected in parallel with respect to each other and in series with the transformer winding 186, and anode 187. Across this resistor-capacitor hookup, a voltage is developed, which is substantially proportional to temperature error, that is, proportional to the difference between actual and selected engine temperature. This voltage provides the input to a differentiating circuit including a capacitor 190, and resistor 191, the output of which is impressed on a grid 192 of the twin triode 180. The grid 192 is connected to a fixed bias 193 fed from the 105 volt regulated D.C. source, which forms a part of the same network which feeds the grid 181. At any time there is a temperature change in the engine, the differentiating capacitor either charges or discharges, thereby producing a voltage drop across the grid resistor 191 that is proportional to the rate of change of temperature. This variation in voltage drop across the resistor varies the bias on the grid 192 and hence controls the current flowing through anode 195 in such a way, to be hereinafter explained, that the current opposes or damps the action of the temperature signal current, which is a function of the temperature indication signal voltage produced in amplifier 175, to thereby prevent engine temperature hunting.

The three signals, namely, the r.p.m. signal from the r.p.m. sensitive amplifier, temperature signal from the temperature sensitive amplifier, and the temperature antihunt signal from the rate of change of temperature amplifier, are fed into the combining amplifier and thyratron output 24 through a bridge circuit. The combining amplifier includes the twin triode tube 196 having its anodes 197 and 198 connected in parallel with respect to each other and with respect to anode 195 which carries the current which is a function of the temperature anti-hunt signal. The three anodes 195, 197, and 198 are connected in parallel with a diode rectifier 199 and its series resistor 200 and capacitor filter 201. The anodes 195, 197, and 198 are all fed from a secondary winding 202 of the transformer 100 and therefore conduct only on positive half cycles. Tube 196 is provided with two grids 203 and 204, the former of which has the r.p.m. signal impressed upon it to thereby control the flow of current through anode 197, and the latter of which receives the voltage signal from the temperature signal amplifier 175 to thereby control the flow of current through anode 198. An output pentode tube 205 has a control grid 206 connected to the diode load filter at 207. The grid 206 is also connected to the 105 volt regulated D.C. source through a network including the resistor 183, capacitor 208, diode load filter, and resistor 209 so as to obtain a definite fixed bias on the grid to bias the tube 205 to cut off. The resistor 209 limits the passage of current should grid 206 become positive. With this arrangement the voltage across the diode load filter is impressed on the grid 206 as a control voltage of the output tube 205. In order to cause the voltage on grid 206 to become more positive, that is, less negative when the anodes 195, 197, and 198 conduct current, a resistor 212 is connected in series with the secondary winding 202. On the positive half cycle, that is, when the anode of the diode rectifier is positive and the anodes 195, 197, and 198 are not conducting, some current flows through the anode circuit of the diode rectifier but at this time the current is too small to alter the bias voltage across the diode resistor sufficiently to cause the control tube to conduct. Any increase in current through resistor 212 creates a higher voltage drop across this resistor. The higher the voltage drop across resistor 212 the lower the potential across the diode filter resistor 200, that is, the lower the bias on grid 206 and consequently the greater the flow of current in anode circuit 214 of tube 205.

The output tube 205 controls the passage of current through a saturable reactor 216 having windings 217 and 218. The winding 217 is connected in the anode circuit 214 of the tube 205. The anode circuit 214 is fed from the 400 volt D.C. source. Screen grid 219 of the tube is also connected to the 400 volt D.C. source through resistor 220. A suppressor grid 222, of the output tube is connected to cathode 224 which in turn is fed from the 255 volt regulated D.C. source through a filter network including a resistor 226 and a capacitor 228. A biasing resistor 230 is interposed between the cathode and ground. The winding 218 of the saturable reactor forms one leg of a phase shift bridge 232 in circuit with gas tubes 233 and 234. The bridge 232, the function of which is to accomplish a phase shift between grid and cathode voltage of tubes 233 and 234 is of standard design and is familiar to those skilled in the art. The bridge receives its supply from secondaries 235 and 236 inductively connected to transformer 100. The bridge is so arranged in circuit with the gas tubes that the voltages on grids 237 and 238 are normally held 180° out of phase with the voltages on anodes 239 and 240. The anodes 239 and 240 are interconnected with secondary winding 241 which is inductively related to the primary of transformer 100. The magnetically operated valve 26 is provided with field and armature coils 242 and 243 in circuit with the anodes 239 and 240. When direct current flows through winding 217 there is a change in reactor impedance of the saturable reactor thus causing a formal shift of grid voltage phase, of grids 237 and 238, in proportion to the saturating current in winding 217. The direct current through winding 217 is proportional to the valve opening in degrees. This grid voltage phase shift will cause the gas tubes to conduct over more or less of their positive half cycle, depending on the degree of saturation of the saturable reactor and corresponding gas tube grid voltage phase shift. This causes current to flow through coils 242 and 243 of the valve 26 to thereby open the valve an amount proportional to the gas tube anode current which flows through the coils.

The electromagnetic valve 26 (see Figure 3), which is located in the fuel system, is provided with a rotary type balanced hollow valve member 245 carried by a bearing 246 and mechanically connected to a rotor of motor 247 in which the coils 242 and 243 are wound. The armature of motor 247 need turn only 90° to accomplish the desired valve opening and is normally held against a stop 248 by a coil spring 249. Current through the coils 242 and 243 produces a torque which rotates the armature in a direction opposing the torque of spring 249 to thereby rotate the valve member in an opening direction. The stop 248 is carried by an adjustable screw 250 to enable setting the valve at any desired minimum flow. Two elongated openings 252 are disposed circumferentially about the valve member for regulating the flow of fuel from inlet port 253 to outlet passages 254 oppositely positioned in valve body 255. Flow from the inlet 253 to the outlet passages 254 is through circumferential openings 256, interior of the hollow valve member, and thence the elongated openings 252 to the outlet passages 254. No seals are necessary since the valve member and armature are all immersed in the fuel, the flow of which is to be controlled. The field and armature coils are immune to the effects of the fuel. For a complete description of the principles involved in the operation of valve 26 which per se forms no part of the present invention, see my application Serial No. 708,019, filed November 6, 1946, now abandoned. The valve is so constituted that it has a speed of response compatible with the speed of response of the electronic parts of the control and is able to reset the fuel flow according to signals from the control within a few tenths of a second.

The combined regulator and relief valve 34 (see Figure 4) is interposed between the pump 28 and magnetically operated valve 26. The regulator valve may be any of the conventional diaphragm versus spring regulators constituted to produce a fairly constant pressure drop across the magnetically controlled valve 26. The interior of the regulator is provided with a bore 260 in which a valve sleeve 262 slides. A bore 264 provides a chamber into which one end of each of conduits 265, and 266 are connected, with their other ends connected to the valve 26 and the pump 28 respectively. Bore 264 is in communication with a chamber 268 through openings 270 in the valve sleeve 262. The chamber 268 is connected to the inlet side of the pump 28 by a conduit 272.

One side of diaphragm 258 communicates through damping restriction 254b, and line 254a to valve outlet passages 254 of valve 26. The other side of the diaphragm communicates with the valve inlet line 265 through line 253a. A damping bleed 253b is also provided to prevent chattering and allow air to escape during initial filling of the chamber containing spring 274.

With this arrangement, since equal areas are exposed on each side of the diaphragm 258, the pressure in chamber 264, which is in communication with the inlet line 265, will be held higher than the pressure in line 254 by an amount equal to the force exerted by spring 274. If the pressure differential across this diaphragm exceeds that amount, the valve sleeve 262 will be pushed in a direction to compress spring 274 to thereby uncover holes 270 and by-pass through holes 262, the pump output which is in excess of the amount necessary to maintain the aforementioned pressure differential to the pump inlet through conduit 272. A spring loaded relief valve 280 is located interiorly of the valve sleeve to be opened when the pressure in the bore 264 exceeds a predetermined value which will occur only when the cut off valve 32 is closed.

For altitudes below 20,000 feet the system above described is adequate since the initial setting of the control for turbine idling speeds within this range will not require resetting. However, for altitudes in excess of 20,000 feet means is provided for resetting the reference voltages or signals for r.p.m. and automatic temperature. The means for accomplishing this resetting of the reference voltages for r.p.m. and automatic temperature comprises the servo mechanism 36 which embraces a low inertia two phase induction motor 282 mechanically connected to the wiper arm of potentiometer 162, as aforementioned, and to the wiper arm 115 of the potentiometer 113. The motor 282 is equipped with two coils 284 and 286 connected to a common source of supply, for example, the 115 v., 400 cycle source shown. Coil 284 is in series with a capacitor 288 of such size to cause the current in that circuit to be in phase with the voltage. Coil 286 is in series with a larger capacitor 290 of such size as to cause the current to lead the voltage in that circuit. This arrangement normally causes the motor to rotate in a given direction. However, should the larger capacitor 290 be rendered ineffective, that is shorted out of the circuit, the current in that circuit would lag the voltage, since this circuit is now purely inductive, the motor would, therefore, rotate in the opposite direction.

The device herein used to render the capacitor 290 ineffective comprises a thyratron tube 292 connected in parallel with the capacitor and normally kept from conducting by connecting the control grid 294 through resistors 298 and 300 to the grounded line of the A.C. heater voltage, which is out of phase with the anode potential of anode 296. To fire the thyratron tube the junction 316 of resistors 298 and 300 is connected to the ungrounded line of the A.C. heater voltage, which is in phase with the anode voltage, thus effectively connecting the grid 294 to this ungrounded line. This is done by a switching device including a temperature compensated bellows 303 having a length inversely proportional to altitude (outside air pressure) which controls the relative position of contacts 304 and 306 by moving contact 304, and a cam 308, driven by motor 282, which controls the position of contact 306. The bellows is supported on a member 310 carried by a base 312 made of insulating material. A wire 314 connects the member 310 to the junction 316 between the resistors 298 and 300 thereby shorting out the resistor 300 when contacts 304 and 306 are closed. Since the bellows 303 must carry current it is made from a current conducting material. Contact 306 is carried by an arm 318 pivoted at 320. A spring 322 is interposed between member 310 and arm 318 so as to urge them apart. An insulating sleeve 324 insulates spring 322 from arm 318. A fixed finger contact, 326 integral with member 310, and contact 328 carried by arm 318 do the making and breaking of the grid circuit below 20,000 feet altitude. Above 20,000 feet bellows 303 has expanded so that its length is greater than the finger contact 326. Under the latter conditions the making and breaking of the grid circuit is done by contacts 306 and 308. Wire 330 connects arm 318, the cathode 294, and one side of the heater to secondary 332 of transformer 100. In operation the motor runs continuously, first in a direction to close the contacts, and after they are closed the motor reverses its direction of rotation immediately and runs in the reverse direction until the contacts are opened. This cycling of the motor first to close then to open the contacts is continuous and very rapid. The spring 322 moves the arm in one direction tending to break the contacts, and the cam 308, through its rotation by the motor, moves the arm in the opposite direction tending to make the contacts.

Operation of the system is as follows: Assume a condition in which the turbine is running at 5,000 r.p.m. and the pilot suddenly moves the contact arm 114 of the r.p.m. control to 8,000 r.p.m. For this new r.p.m. setting an 800° centigrade temperature acceleration is desired and is obtained by moving arm 161 to its proper position. It should be pointed out that at 5,000 r.p.m. the engine temperature is around 550° C. Valve 26, which had been in some intermediate position where it was supplying just enough fuel to maintain the turbine at 5,000 r.p.m. now starts to open to increase the fuel flow. Instantly, the temperature of the turbine rises and the turbine r.p.m. starts to rise more slowly. Depending upon the rate of temperature rise, the temperature anti-hunt signal, produced in the rate of change of temperature amplifier 22, anticipates the approach of 800° C. temperature and starts retarding the rate of valve opening, resulting in a decrease in rate of temperature rise. The time constants of this circuit are fixed so that the anticipating action, aforementioned, disappears as the steady state condition of 800° C. is reached, and the valve assumes a position in which it holds 800° C. for the r.p.m. at which the turbine is now running. Remembering, of course, that at this time only the temperature setting has been obtained and that the desired r.p.m. of the turbine has not yet been reached. With an increase in turbine r.p.m., more and more air is pumped into the engine which tends to lower its temperature. Therefore, in order to maintain 800° C. more and more fuel is supplied to the engine.

As the turbine r.p.m. approaches its setting, 8,000 r.p.m. in the present example, the r.p.m. anti-hunt signal, produced in the rate of change of r.p.m. amplifier 14, comes into action and anticipates the preselected speed, whereby an overriding of the temperature signal takes place, with a consequent reduction in rate of valve opening. Engine r.p.m. continues to increase although at a slower rate because of the overriding action of the r.p.m. anti-hunt signal on the engine temperature signal. With the engine nearly to its desired speed setting, the r.p.m. anti-hunt signal, now quite small, relinquishes control to the r.p.m. signal, which attains a balance at 8,000 r.p.m. and holds the valve in the new position to maintain this engine r.p.m. until the r.p.m. control setting is again changed.

A sudden decrease in the r.p.m. control setting will cause the valve to close against its stop 248 at which time only a fixed amount of fuel is delivered to the engine until the engine r.p.m. is nearly to the new setting at which time the valve will begin to open, in response to both r.p.m. and r.p.m. anti-hunt signals, just enough to maintain engine r.p.m. at this new setting.

I claim:

1. A control mechanism for the fuel system of an engine comprising a valve in the system, means for establishing a reference voltage signal corresponding to a preselected engine speed, means for establishing a voltage signal corresponding to actual engine speed, means for establishing a reference voltage signal corresponding to preselected engine temperature, means for establishing a voltage signal corresponding to actual engine temperature, an output thermionic tube having a grid therein, means for combining the voltage signals corresponding to differences in actual and reference voltage signals for both engine speed and temperature and converting the same into a resultant voltage which is impressed on said grid, and electrical means interconnecting the output thermionic tube with said valve, said last mentioned means controlled by current through said tube, whereby the valve opening is regulated.

2. A control mechanism for the fuel system of an engine comprising means for producing a signal the amplitude of which depends on the error between actual and selected engine speeds and the phase of which depends on whether engine speed is above or below the selected speed, means for producing a signal the amplitude of which depends on the error between actual and selected engine temperatures and the phase of which depends on whether engine temperature is above or below the selected temperature, means for combining said signals in a manner to produce a voltage signal the magnitude of which varies in accordance with the amplitude and phase of said first and second mentioned signals, and means controlled by said voltage signal including a valve device in said system operative to control the flow of fuel.

3. A control mechanism for the fuel system of an engine comprising means for producing a signal the amplitude of which depends on the error between actual and selected engine speeds and the phase of which depends on whether engine speed is above or below the selected speed, means for producing a signal proportional to the rate of change of engine speed, said first and second mentioned means being interconnected so that a signal produced by said first mentioned means is added algebraically to a signal produced by said second mentioned means to provide a resultant signal, means for producing a signal the amplitude of which depends on the error between actual and selected engine temperatures and the phase of which depends on whether engine temperature is above or below the selected temperature, means for combining said resultant and last named signals in a manner to produce a voltage signal the magnitude of which varies in accordance with the amplitude and phase of said resultant and last named signals, and means controlled by said voltage signal including a valve device in said system operative to control the flow of fuel.

4. A control mechanism for the fuel system of an engine comprising means for producing a signal the amplitude of which depends on the error between actual and selected engine speeds and the phase of which depends on whether engine speed is above or below the selected speed, means for producing a signal proportional to the rate of change of engine speed, said first and second mentioned means being interconnected so that a signal produced by said first mentioned means is added algebraically to a signal produced by said second mentioned means to provide a resultant signal, means for producing a signal the amplitude of which depends on the error between actual and selected engine temperatures and the phase of which depends on whether engine temperature is above or below the selected temperature, means for producing a signal proportional to the rate of change of engine temperature to prevent engine temperature hunting, means for combining said resultant signal with the two latter signals in a manner to produce a voltage signal the magnitude of which varies in accordance with the amplitude and phase of the respective signals that were combined, and means controlled by said voltage signal including a valve device located in said system operative for controlling the flow of fuel.

5. A mechanism for controlling the fuel supplied to a jet engine adapted to be mounted in an aircraft comprising an amplifier circuit constituted to receive a voltage input signal which reflects actual engine r.p.m., means including a potentiometer for producing a voltage signal which reflects selected engine r.p.m. and for mixing the latter voltage signal with the input voltage signal in such a manner as to cause the amplifier to emit an output voltage signal which varies in amplitude and phase depending on the error in actual and selected r.p.m. and on whether engine r.p.m. is above or below the selected r.p.m., mechanism operative at a predetermined altitude and controllably connected to said potentiometer to automatically change the selected r.p.m. signal, and means controlled by said output voltage signal for governing the flow of fuel to an engine.

6. A mechanism for controlling the fuel supplied to an engine comprising an amplifier circuit constituted to receive a voltage input signal which reflects actual engine r.p.m., means for producing a voltage signal which reflects selected engine r.p.m. and for mixing the latter voltage signal with the input voltage signal in such a manner as to cause the amplifier to emit a resultant voltage signal the amplitude of which depends on the error between actual and selected engine r.p.m. and the phase of which depends on whether engine r.p.m. is above or below the selected r.p.m., a rate circuit interconnected with said amplifier and having an input voltage signal which reflects actual engine r.p.m. and an output voltage signal proportional to the rate of change of engine r.p.m., the output voltage signal from said rate circuit being fed into said amplifier circuit to modify its voltage signal, and means controlled by said resultant signal as modified for governing the fuel supply to said engine.

7. A mechanism for controlling the fuel supplied to an engine comprising a first amplifier constituted to have two sources of input signals, one of which reflects actual engine temperature and the other of which reflects selected engine temperature, said input signals being fed into the amplifier in such a manner that the amplitude of the amplifier output signal depends on the error between actual and selected engine temperature and the phase of the output signal depends on whether engine temperature is above or below the selected temperature, a second amplifier constituted to receive an input signal which reflects actual engine r.p.m., means interconnected with said second amplifier for producing a signal which reflects selected engine r.p.m., said actual and selected r.p.m. signals being fed into said second amplifier in a manner such that the output signal of said second amplifier will vary in amplitude depending on whether engine r.p.m. is above or below the selected signal r.p.m. and the phase of said last mentioned output signal will depend on whether engine r.p.m. is above or below the selected engine r.p.m., a combining amplifier for receiving the output signals from said first and second amplifiers and producing its own output signal having a magnitude which varies in accordance with the amplitude and phase of said combined signals, and means controlled by the output signal from said combining amplifier for controlling fuel to an engine.

8. A mechanism for controlling the fuel supplied to a jet engine adapted to be used on an aircraft comprising a first amplifier constituted to have two sources of input signals, one of which reflects actual engine temperature and the other of which reflects selected engine temperature, said input signals being fed into the amplifier in such a manner that the amplitude of the amplifier output signal depends on the error between actual and selected engine temperature and the phase of the output signal depends on whether engine temperature is above or below the selected temperature, a second amplifier constituted to receive an input signal which reflects actual engine r.p.m., means interconnected with said second amplifier for producing a signal which reflects selected engine r.p.m., said actual and selected r.p.m. signals being fed into said second amplifier in a manner such that the output signal of said second amplifier will vary in amplitude depending on whether engine r.p.m. is above or below the selected engine r.p.m. and the phase of said last mentioned output signal will depend on whether engine r.p.m. is above or below the selected engine r.p.m., a combining amplifier for receiving the output signals from said first and second amplifiers and producing an output signal of its own having a magnitude which varies in accordance with the amplitude and phase of said combined signals, an aneroid operated servo mechanism for resetting the selected engine temperature and r.p.m. at a predetermined altitude, and means controlled by the signal emanating from the combining amplifier for controlling fuel flow to an engine.

9. An electrical apparatus for controlling the fuel supplied to a jet engine adapted to be used on an aircraft comprising a first network provided with two input signals, one of which reflects actual engine temperature and the other of which reflects selected engine temperature, said input signals being connected in series so that the amplitude of the network output signal represents the error between actual and selected engine temperature and the phase of said output signal depends on whether engine temperature is above or below the selected temperature, a second network provided with two input signals, one of which reflects actual engine r.p.m. and the other of which reflects selected engine r.p.m., said two input signals to said second network being connected in series so that the amplitude of the second network output signal represents the error between actual and selected engine r.p.m. and the phase of said second network output signal depends on whether engine r.p.m. is above or below the selected r.p.m., a combining network into which said output signals from said first and second networks are fed for producing a signal as a function of said output signals, and means connected to said combining network and responsive to engine temperature and r.p.m. below the respective selected values for increasing fuel flow.

10. An electrical apparatus for controlling the fuel supplied to a jet engine adapted to be used on an aircraft comprising a first network provided with two input signals, one of which reflects actual engine temperature and the other of which reflects selected engine temperature, said input signals being combined so that the amplitude of the network output signal represents the error between actual and selected engine temperature and the phase of said output signal depends on whether engine temperature is above or below the selected temperature, a second network provided with two input signals, one of which reflects actual engine r.p.m. and the other of which reflects selected engine r.p.m., said two input signals to said second network being combined so that the amplitude of the second network output signal represents the error between actual and selected engine r.p.m. and the phase of said second network output signal depends on whether engine r.p.m. is above or below the selected r.p.m., a combining network into which the output signals of said first and second networks are fed for producing a resultant signal which is a function of said output signals, and means connected to said combining network and responsive to either engine temperature or speed above the respective selected values for decreasing fuel flow.

11. An electrical apparatus for controlling the fuel supplied to a jet engine adapted to be used on an aircraft comprising a first network including a rate circuit capable of providing a signal proportional to the rate of change of engine r.p.m., an r.p.m. circuit provided with an input signal which represents actual engine r.p.m., said rate and r.p.m. circuits being connected so that their signals are additive to thereby establish a resultant signal, a circuit for producing a signal which represents a selected engine r.p.m., said circuits being connected so that said resultant and selected engine r.p.m. signals are combined, thus producing an output signal from the first network having an amplitude which represents the error between the resultant signal and the signal representing the selected engine r.p.m. and the phase of which depends on the relative magnitudes of said two latter signals, a second network provided with two input signals, one of which reflects actual engine temperature and the other of which reflects selected engine temperature, said two input signals to said second network being fed into said second network so that the output signal therefrom has an amplitude which represents the error between actual and selected engine temperature and the phase of which depends on whether engine temperature is above or below the selected engine temperature, a combining network into which said output signals from said first and second networks are fed for producing a signal as a function of said output signals, and means connected to said combining network and responsive to engine temperature and r.p.m. below the respective selected values for increasing fuel flow.

12. An electrical apparatus for controlling the fuel supplied to a jet engine adapted to be used on an aircraft comprising a first network including a rate circuit capable of providing a signal proportional to the rate of change of engine r.p.m., an r.p.m. circuit provided with an input signal which represents actual engine r.p.m., said rate and r.p.m. circuits being connected so that their signals are additive to thereby establish a resultant signal, a circuit for producing a signal which represents a selected engine r.p.m., said circuits being connected so that said resultant and selected engine r.p.m. signals are combined, thus producing an output signal from the first network having an amplitude which represents the error between the resultant signal and the signal representing the selected engine r.p.m. and the phase of which depends on the relative magnitudes of said two latter signals, a second network provided with two input signals, one of which reflects actual engine temperature and the other of which reflects selected engine temperature, said two input signals to said second network being fed into said second network so that the output signal therefrom has an amplitude which represents the error between actual and selected engine temperature and the phase of which depends on whether engine temperature is above or below the selected engine temperature, altitude responsive means connected to the networks for determining minimum engine speed and temperature setting at a given altitude, a combining network into which said output signals from said first and second networks are fed for producing a signal as a function of said output signals, and means connected to said combining network and responsive to engine temperature and r.p.m. below the respective selected values for increasing fuel flow.

13. A control mechanism for the fuel system of an engine comprising a fuel device in the system, means for establishing a reference voltage signal corresponding to a preselected engine speed, means for establishing a voltage signal corresponding to actual engine speed, means including an amplifier having its input connected to said reference and actual speed voltage signals in a manner to provide an output signal the amplitude of which depends on the error between the reference and the actual engine speed and the phase of which depends on whether engine speed is above or below the reference speed, means for establishing a reference voltage signal corresponding to preselected engine temperature, means for establishing a voltage signal corresponding to actual engine temperature, means including an amplifier having its input connected to said reference and actual temperature voltage signals in a manner to provide an output signal the amplitude of which depends on the error between the reference and the actual engine temperature and the phase of which depends on whether engine temperature is above or below the reference temperature, and means connected to said fuel device and to said amplifiers for receiving said output signals and for utilizing the same in a manner to continuously control the fuel device.

14. A control mechanism for a fuel system of an engine comprising means for producing a signal the amplitude of which depends on the error between actual and selected engine speeds and the phase of which depends on whether engine speed is above or below the selected speed, means for producing a signal proportional to the rate of change of engine speed, said first and second mentioned means being interconnected so that a signal produced by said first mentioned means is added algebraically to a signal produced by said second mentioned means to provide a resultant signal, means for producing a signal the amplitude of which depends on the error between actual and selected engine temperatures and the phase of which depends on whether engine temperature is above or below the selected temperature, means for receiving said resultant and last named signals and for connecting them together in a manner to provide an output signal which varies in accordance with the amplitude and phase of the speed and temperature signals respectively, and a fuel device connected to the output of said last mentioned means.

15. An electrical apparatus for controlling the fuel supplied to a jet engine adapted to be used on an aircraft comprising a first network provided with two input signals, one of which represents an actual engine condition and the other of which represents a preselected value of the engine condition, said input signals being electrically connected in such a manner that the amplitude of the network output signal represents the error between the actual and the preselected values of said condition and the polarity of said output signal depends on whether the value of said actual engine condition is above or below the preselected value of engine condition, a second network provided with two input signals, one of which reflects a second actual engine condition and the other of which reflects a preselected value of the second engine condition, said two latter input signals being electrically connected in such a manner that the amplitude of the second network output signal reflects the error between the actual and the preselected values of said second condition and the polarity of said second network output signal depends on whether the value of said actual second engine condition is above or below the preselected value of the second engine condition, a combining network into which the output sigals of said first and second networks are fed for producing a resultant signal which is a function of said output signals from said first and second networks, and means connected to said combining network for governing fuel flow.

16. An electrical apparatus for controlling the fuel supplied to a jet engine adapted to be used on an aircraft comprising a network including a rate circuit capable of providing a signal proportional to the rate of change of engine r.p.m., an r.p.m. circuit provided with an input signal which represents actual engine r.p.m., said rate and r.p.m. circuits being connected so that their signals are additive to thereby establish a resultant signal, an r.p.m. circuit provided with an input signal which represents a selected r.p.m., means connecting said resultant and selected r.p.m. signals so that said network creates an output signal whose phase and amplitude vary as a function of the relative magnitudes of said resultant and selected r.p.m. signals, means for producing a signal the amplitude of which depends on the error between actual and selected engine temperatures and the phase of which depends on whether engine temperature is above or below the selected temperature, means for receiving said network output signal and said last named signals and for connecting them together in a manner to provide a final signal which varies in accordance with the amplitude and phase of the r.p.m. and temperature signals respectively, and a fuel device connected to the output of said last mentioned means.

17. A fuel control system for an aircraft engine comprising means controlled by the difference in actual and selected engine speeds, means for selecting engine speed and including a device for changing the selected speed at a predetermined altitude, said first named means also controlled by the difference in actual and selected engine temperature, means for selecting a temperature at which said engine is to operate and including a device for changing the selected speed at a predetermined altitude, mechanism associated with said devices and operative at said predetermined altitude for automatically establishing new engine speed and temperature selections, and means controlled by said first named means for governing fuel to said engine.

18. A mechanism for controlling the fuel supplied to a jet engine adapted to be mounted in an aircraft comprising an amplifier circuit constituted to receive a voltage input signal which reflects actual engine r.p.m., means including a potentiometer for producing a voltage signal which reflects selected engine r.p.m. and for mixing the latter voltage signal with the input voltage signal in such a manner as to cause the amplifier to emit a resultant signal the amplitude of which depends on the error between actual and selected engine r.p.m. and the phase of which depends on whether engine r.p.m. is above or below selected r.p.m., a rate circuit interconnected with said amplifier and having an input voltage signal which reflects actual engine r.p.m. and an output voltage signal proportional to the rate of change of engine r.p.m., means mechanically connected to said potentiometer for automatically determining a minimum speed setting at a given altitude, and means controlled by said resultant signal for governing the fuel supplied to an engine.

References Cited in the file of this patent

UNITED STATES PATENTS

| | | |
|---|---|---|
| 2,134,901 | Wey | Nov. 1, 1938 |
| 2,219,994 | Jung | Oct. 29, 1940 |
| 2,245,562 | Becker | June 17, 1941 |
| 2,257,471 | McGrath | Sept. 30, 1941 |
| 2,274,693 | Heinrich | Mar. 3, 1942 |
| 2,275,317 | Ryder | Mar. 3, 1942 |
| 2,303,654 | Newton | Dec. 1, 1942 |
| 2,336,232 | Doran | Dec. 7, 1943 |
| 2,341,257 | Wünsch | Feb. 8, 1944 |
| 2,366,618 | Harrison | Jan. 2, 1945 |
| 2,382,847 | Baumann | Aug. 14, 1945 |
| 2,390,793 | Jones | Dec. 11, 1945 |
| 2,404,428 | Bradbury | July 23, 1946 |
| 2,422,808 | Stokes | June 24, 1947 |
| 2,428,702 | Elliot | Oct. 7, 1947 |
| 2,441,967 | Haug | May 25, 1948 |
| 2,471,821 | Kutzler | May 31, 1949 |
| 2,472,396 | Schoenbaum | June 7, 1949 |
| 2,482,812 | Treseder | Sept. 27, 1949 |
| 2,488,221 | Moore | Nov. 15, 1949 |
| 2,491,380 | Kutzler | Dec. 13, 1949 |
| 2,492,472 | Fortescue | Dec. 27, 1949 |
| 2,493,476 | Crum et al. | Jan. 3, 1950 |
| 2,521,244 | Moore | Sept. 5, 1950 |
| 2,542,499 | Fortescue | Feb. 20, 1951 |
| 2,545,703 | Orr | Mar. 20, 1951 |
| 2,554,717 | Mouzon | May 29, 1951 |
| 2,606,420 | Moore | Aug. 12, 1952 |

FOREIGN PATENTS

| | | |
|---|---|---|
| 863,125 | France | Dec. 23, 1940 |